United States Patent
Glassman

(10) Patent No.: US 12,208,566 B2
(45) Date of Patent: Jan. 28, 2025

(54) METHOD AND SYSTEM FOR LEVELING A LAYER IN FREEFORM FABRICATION

(71) Applicant: Stratasys Ltd., Rehovot (IL)

(72) Inventor: Barak Glassman, Nes Ziona (IL)

(73) Assignee: Stratasys Ltd., Rehovot (IL)

( * ) Notice: Subject to any disclaimer, the term of this patent is extended or adjusted under 35 U.S.C. 154(b) by 526 days.

(21) Appl. No.: 17/600,360

(22) PCT Filed: Mar. 30, 2020

(86) PCT No.: PCT/IL2020/050387
§ 371 (c)(1),
(2) Date: Sep. 30, 2021

(87) PCT Pub. No.: WO2020/202147
PCT Pub. Date: Oct. 8, 2020

(65) Prior Publication Data
US 2022/0152914 A1    May 19, 2022

Related U.S. Application Data

(60) Provisional application No. 62/827,094, filed on Mar. 31, 2019.

(51) Int. Cl.
*B29C 64/112* (2017.01)
*B29C 64/194* (2017.01)
(Continued)

(52) U.S. Cl.
CPC .......... *B29C 64/112* (2017.08); *B29C 64/194* (2017.08); *B29C 64/241* (2017.08);
(Continued)

(58) Field of Classification Search
CPC ... B29C 64/188; B29C 64/194; B29C 64/214; B29C 64/218; B29C 64/241; B22F 10/50; B22F 12/37; B22F 12/226
See application file for complete search history.

(56) References Cited

U.S. PATENT DOCUMENTS 6,259,962 B1    7/2001    Gothait
6,569,373 B2    5/2003    Napadensky
(Continued)

FOREIGN PATENT DOCUMENTS

EP    1522412         4/2005
EP    3360659 A1 *   8/2018    ............. B22F 10/10
(Continued)

OTHER PUBLICATIONS

International Search Report and the Written Opinion Dated Jul. 16, 2020 From the International Searching Authority Re. Application No. PCT/IL2020/050387. (12 Pages).
(Continued)

*Primary Examiner* — Seyed Masoud Malekzadeh
*Assistant Examiner* — Vipul Malik

(57) ABSTRACT

A method of fabricating an object in layers, comprises, for at least one layer: dispensing a building material formulation to form a first portion of the layer, and leveling the first portion by a leveling device; increasing a vertical distance between the first portion and the leveling device; and while a topmost surface of the first portion is exposed and beneath a segment of the leveling device: dispensing a building material formulation to form a second portion of the layer, laterally displaced from the first portion along an indexing direction, and leveling the second portion by the leveling device.

17 Claims, 16 Drawing Sheets

(51) Int. Cl.
*B29C 64/241* (2017.01)
*B29C 64/245* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B29C 64/245* (2017.08); *B33Y 10/00* (2014.12); *B33Y 30/00* (2014.12); *B29C 64/393* (2017.08); *B33Y 50/02* (2014.12)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,364,686 B2 | 4/2008 | Kritchman et al. |
| 7,500,846 B2 | 3/2009 | Eshed et al. |
| 7,658,976 B2 | 2/2010 | Kritchman |
| 7,962,237 B2 | 6/2011 | Kritchman |
| 9,031,680 B2 | 5/2015 | Napadensky |
| 2013/0040091 A1 | 2/2013 | Dikovsky et al. |
| 2017/0173886 A1 | 6/2017 | Menchik et al. |
| 2017/0203508 A1* | 7/2017 | Dikovsky ............... B33Y 10/00 |
| 2018/0071989 A1 | 3/2018 | Zenou et al. |
| 2018/0194060 A1* | 7/2018 | Hara ....................... B33Y 40/20 |
| 2018/0236722 A1* | 8/2018 | Susnjara ................ B29C 64/106 |
| 2020/0047400 A1* | 2/2020 | Chen-Iun-Tai ........ B29C 64/106 |
| 2022/0347919 A1* | 11/2022 | Hascoët ................. B33Y 30/00 |

FOREIGN PATENT DOCUMENTS

| | | | |
|---|---|---|---|
| WO | WO-2017009832 A1 * | 1/2017 | ........... B29C 64/112 |
| WO | WO 2020/202147 | 10/2020 | |

OTHER PUBLICATIONS

International Preliminary Report on Patentability Dated Oct. 14, 2021 From the International Bureau of WIPO Re. Application No. PCT/IL2020/050387. (7 Pages).

* cited by examiner

METHOD AND SYSTEM FOR LEVELING A LAYER IN FREEFORM FABRICATION

RELATED APPLICATIONS

This application is a National Phase of PCT Patent Application No. PCT/IL2020/050387 having International filing date of Mar. 30, 2020, which claims the benefit of priority under 35 USC § 119 (e) of U.S. Provisional Patent Application No. 62/827,094 filed on Mar. 31, 2019. The contents of the above applications are all incorporated by reference as if fully set forth herein in their entirety.

FIELD AND BACKGROUND OF THE INVENTION

The present invention, in some embodiments thereof, relates to freeform fabrication and, more particularly, but not exclusively, to a method and system for leveling a layer in freeform fabrication.

Additive manufacturing (AM) is generally a process in which a three-dimensional (3D) object is manufactured utilizing a computer model of the objects. Such a process is used in various fields, such as design related fields for purposes of visualization, demonstration and mechanical prototyping, as well as for rapid manufacturing.

The basic operation of any additive manufacturing system consists of slicing a three-dimensional computer model into thin cross sections, translating the result into two-dimensional position data and feeding the data to control equipment which manufactures a three-dimensional structure in a layerwise manner.

Additive manufacturing entails many different approaches to the method of fabrication, including three-dimensional printing, e.g., three-dimensional inkjet printing, laminated object manufacturing, fused deposition modeling and others.

In three-dimensional printing processes, for example, a building material is dispensed from a dispensing head having a set of nozzles to deposit layers of building material on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,364,686, 7,500,846, 7,658,976, 7,962,237, and 9,031,680, and U.S. Published Application Nos. US 20130040091 and 20170173886, all of the same Assignee, the contents of which are hereby incorporated by reference.

For example, U.S. Published Application No. 20170173886 discloses a three-dimensional printing system with a rotary tray configured to rotate about a vertical axis, a printing head having a plurality of separated nozzles, and a controller configured for controlling the inkjet printing heads to dispense, during the rotation, droplets of building material in layers. The system also includes a leveling device that straightens the newly formed layer prior to the formation of the successive layer thereon.

SUMMARY OF THE INVENTION

According to an aspect of some embodiments of the present invention there is provided a method of fabricating an object in layers. The method comprises, for at least one layer: dispensing a building material formulation to form a first portion of the layer, and leveling the first portion by a leveling device; increasing a vertical distance between the first portion and the leveling device; and while a topmost surface of the first portion is exposed and beneath a segment of the leveling device: dispensing a building material formulation to form a second portion of the layer, laterally displaced from the first portion along an indexing direction, and leveling the second portion by the leveling device.

According to some embodiments of the invention the method comprises increasing a vertical distance between the second portion and the leveling device; and while a topmost surface of the second portion is beneath a segment of the leveling device and is exposed: dispensing a building material formulation to form a third portion of the layer, laterally displaced from the first and the second portions along the indexing direction, and leveling the third portion by the leveling device.

According to some embodiments of the invention the method comprises solidifying each portion of the layer prior to a formation of a subsequent portion of the layer.

According to some embodiments of the invention the at least one layer is a plurality of layers, and wherein for each layer of the plurality of layers, the formations of the portions are repeated at the same order.

According to some embodiments of the invention the leveling device extends over a width of the layer along the indexing direction by its entirety, and is non-movable along the indexing direction.

According to some embodiments of the invention the first portion and the second portions are formed from different building material formulations.

According to some embodiments of the invention the first portion and the second portions are formed from the same building material formulations.

According to some embodiments of the invention the dispensing is executed by a printing head of a solid freeform fabrication system, and wherein the increment of the vertical distance is by $L_h/N$, $L_h$ being a height of the layer, and N being a number greater than 1.

According to some embodiments of the invention the method is executed by a solid freeform fabrication system which comprises: a rotary tray configured to rotate about a vertical axis; and a printing head, having a plurality of separated nozzles, and operable to dispense the building material during the rotation, wherein the indexing direction is a radial direction defined relative to the vertical axis.

According to some embodiments of the invention the solid freeform fabrication comprises a plurality of printing heads, each configured to reciprocally move relative to the tray along the radial direction, wherein for at least two of the inkjet printing heads, the reciprocal motion is independent and at a different azimuthal angle.

According to an aspect of some embodiments of the present invention there is provided a solid freeform fabrication (SFF) system for fabricating an object in layers. The system comprises: a printing head, having a plurality of separated nozzles for dispensing one or more building material formulations; a leveling device for leveling the dispensed building material formulation; and a controller configured to control the printing head so as to dispense a building material formulation to form a first portion of a layer, to ensure a contact between the leveling device and the first portion so as to level the first portion, to increase a vertical distance between the first portion and the leveling device following the leveling, to dispense a building material formulation so as to form a second portion of the layer that is laterally displaced from the first portion, and, while a topmost surface of the first portion is exposed and beneath a segment of the leveling device, to ensure contact between the leveling device and the second portion but not the first portion so as to level the second portion.

According to some embodiments of the invention the system comprises a solidification system for solidifying each portion of the layer prior to a formation of a subsequent portion of the layer.

According to some embodiments of the invention the system comprises a rotary tray configured to rotate about a vertical axis, wherein the printing head is operable to dispense the building material during the rotation, and wherein the indexing direction is a radial direction defined relative to the vertical axis.

According to some embodiments of the invention the system comprises a plurality of printing heads, each configured to reciprocally move relative to the tray along the radial direction, wherein for at least two of the inkjet printing heads, the reciprocal motion is independent and at a different azimuthal angle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
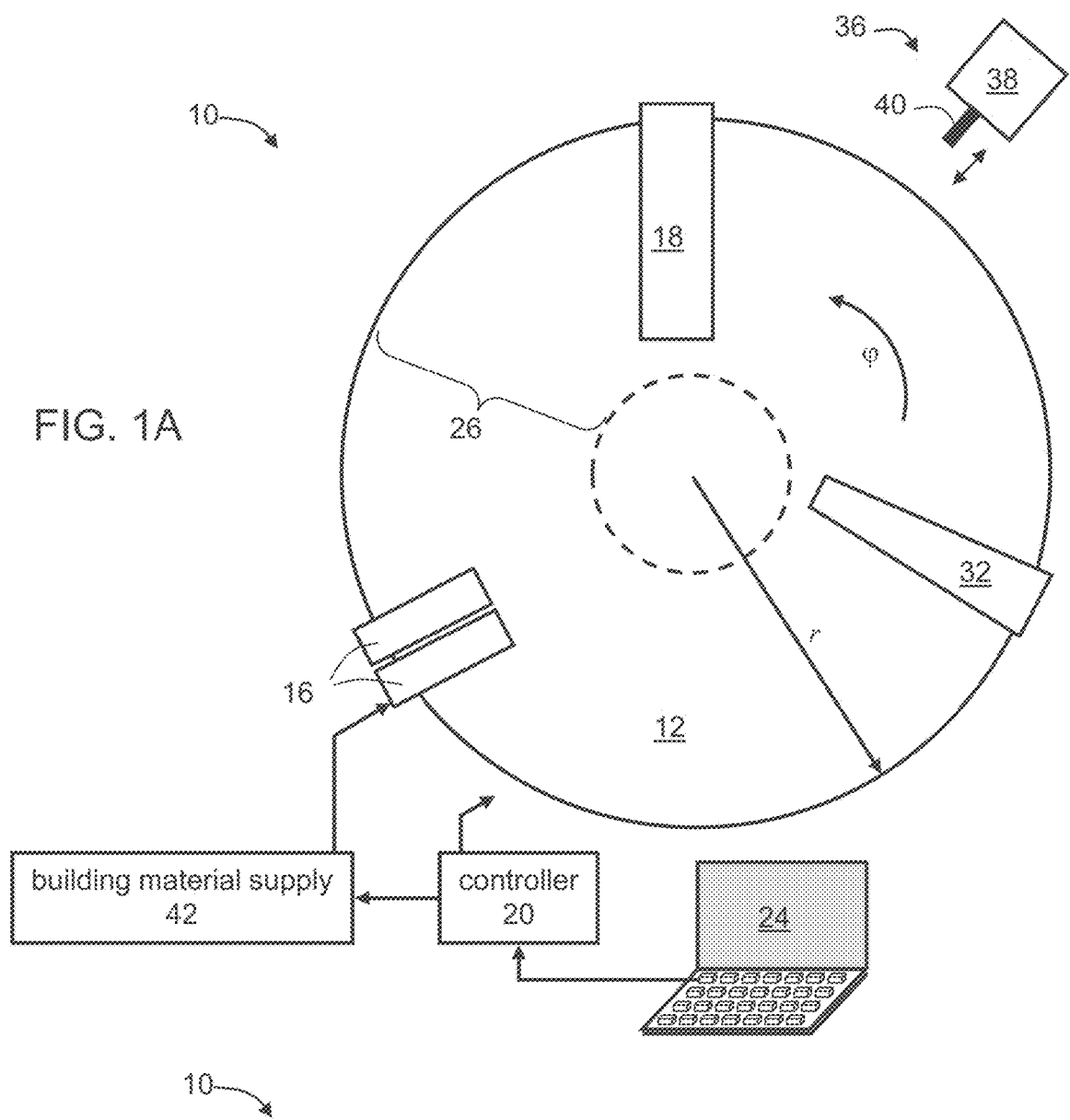
FIGS. 1A-C are schematic illustrations of an additive manufacturing system according to some embodiments of the invention.

The present invention, in some embodiments thereof, relates to freeform fabrication and, more particularly, but not exclusively, to a method and system for leveling a layer in freeform fabrication.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a printing head having one or more arrays of nozzles to deposit building material formulation in layers on a supporting structure. The AM apparatus thus dispenses building material formulation in target locations which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (for example, following solidification, e.g., curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

Figure 1B:
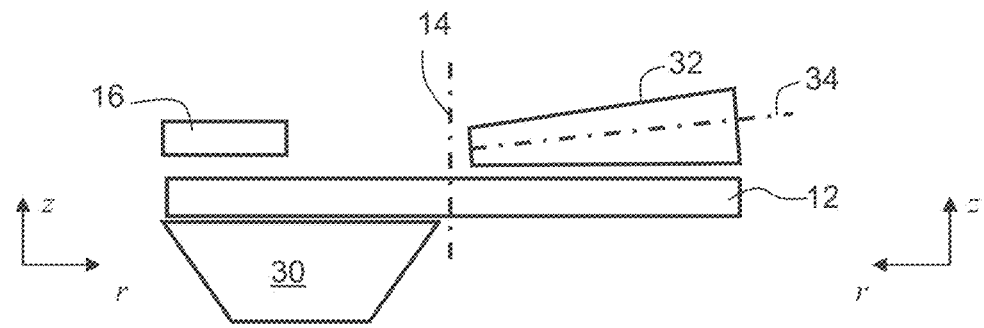
Figure 1C:
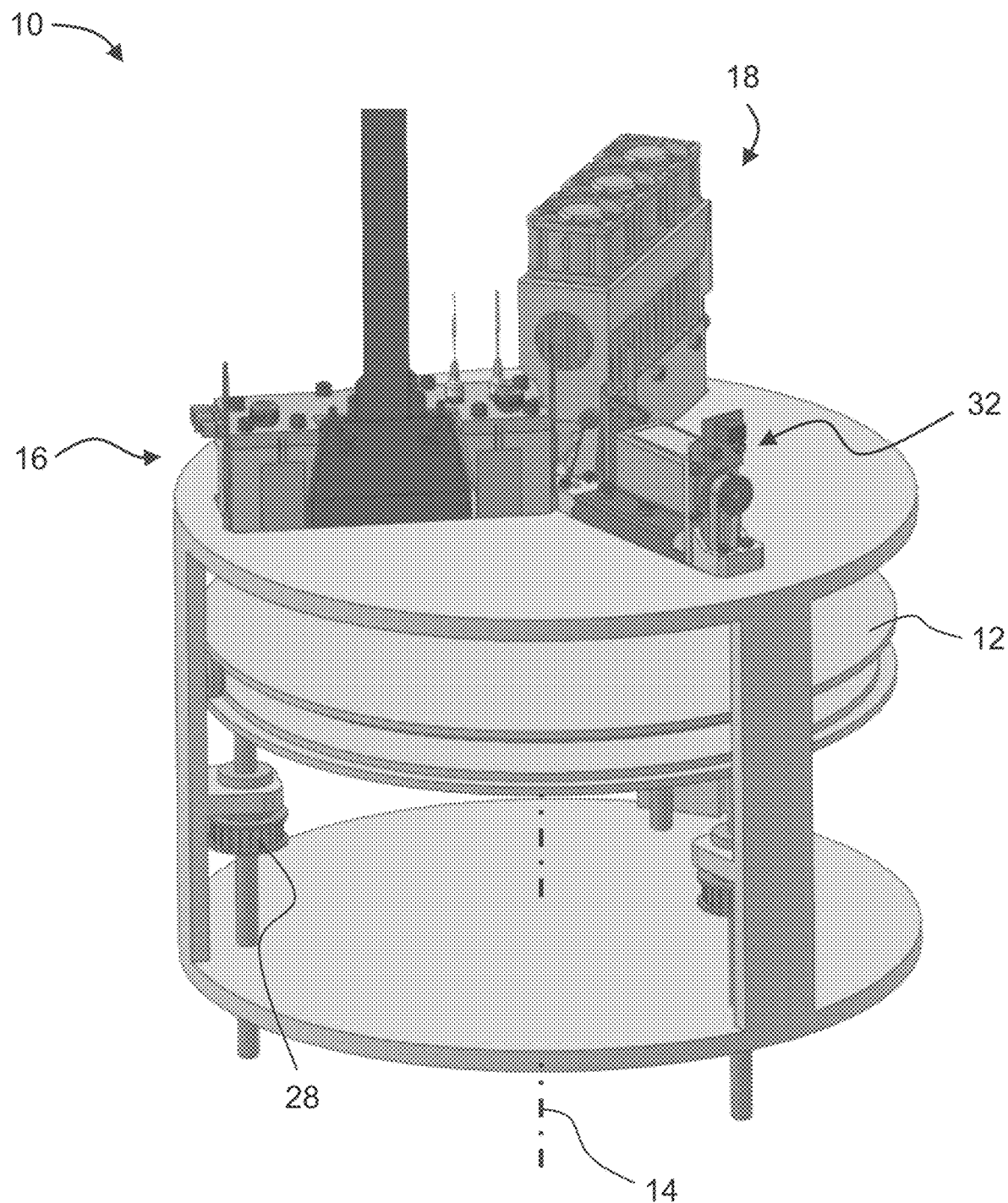

A representative and non-limiting example of a system 10 suitable for AM of an object according to some embodiments of the present invention is illustrated in FIGS. 1A-C. FIGS. 1A-C illustrate a top view (FIG. 1A), a side view (FIG. 1B) and an isometric view (FIG. 1C) of system 10. Preferably, system 10 is a three-dimensional inkjet printing system.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42.

Each printing head is optionally and preferably fed via one or more building material formulation reservoirs (not shown) which may optionally include a temperature control unit (e.g., a temperature sensor and/or a heating device), and a material formulation level sensor.

To dispense the building material formulation, a voltage signal is applied to the printing heads to selectively deposit droplets of material formulation via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Tray 12 can have a shape of a disk or it can be annular. Non-round shapes are also contemplated.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment. Further, while some embodiments of system 10 are described below with a particular emphasis to rotary AM systems, the present disclosure also contemplates embodiments in which the AM system is non-rotary, wherein the relative motion between the heads and the tray is translational, e.g., along straight lines. Representative examples of such an AM system that is suitable for some embodiments are found in U.S. Published Application No. 20100191360, the contents of which are hereby incorporated by reference.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

Generally, as will be explained below, the rotatory motion between the tray and the printing head(s) of the system allows the heads to scan the tray along the azimuthal direction while dispensing building material thereon. Thus, the azimuthal direction is interchangeably referred to herein as the "scanning direction". Typically, the printing head(s) comprise an array of nozzles that are at an angle (typically a right angle) to the scanning direction, so that a particular printing head can dispense several rows of building material, each row extending along the scanning direction. Thus, the radial direction is interchangeably referred to herein as the "indexing direction", indicating that the rows can be indexed along this direction.

It is appreciated, that when the AM system is non-rotary, there is no radial and azimuthal directions. Yet, in non-rotary systems a printing head with an array of nozzles can still scan the tray to form rows of building material. Thus, a similar terminology is also used for non-systems, wherein the direction along which the head scans the tray is referred to as the "scanning direction" and the horizontal direction that perpendicular to the scanning direction is referred to as the "indexing direction." Oftentimes in the literature, the scanning direction is referred to as the X direction and the indexing direction is referred to as the Y direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1A tray replacement device 36 is illustrated as a drive 38 with a movable arm 40 configured to pull tray 12, but other types of tray replacement devices are also contemplated.

Figure 2A:
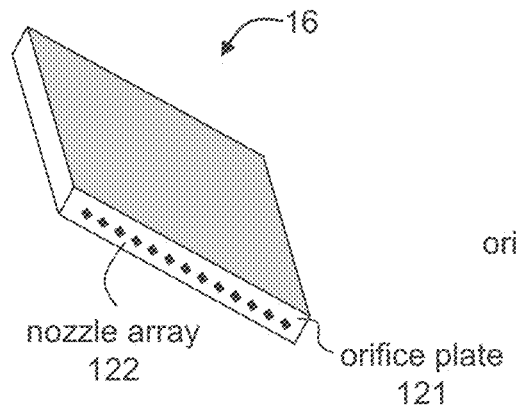
FIGS. 2A-C are schematic illustrations of printing heads according to some embodiments of the present invention.
Figure 2B:
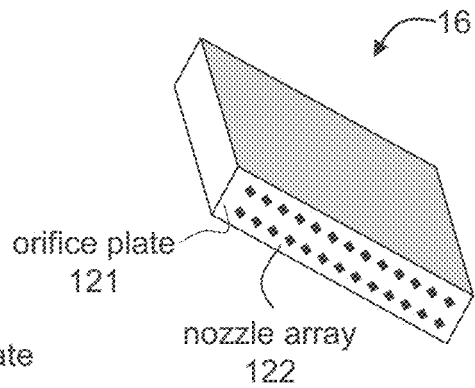
Figure 2C:
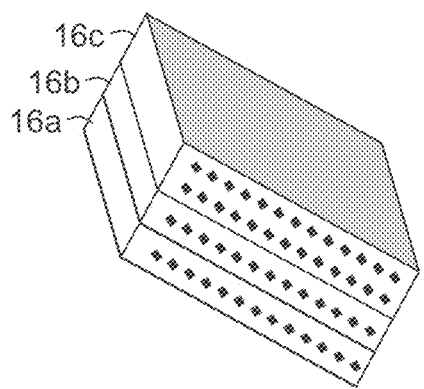

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
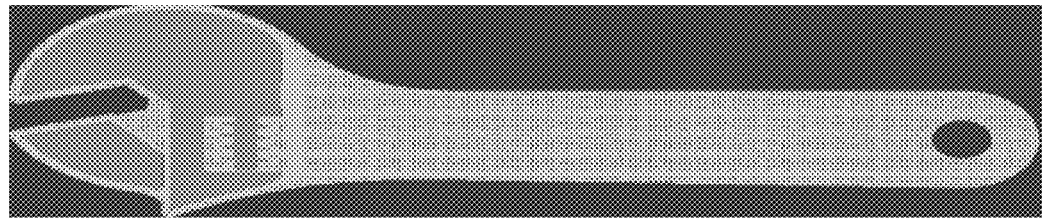
FIGS. 3A and 3B are schematic illustrations demonstrating coordinate transformations according to some embodiments of the present invention.
Figure 3B:
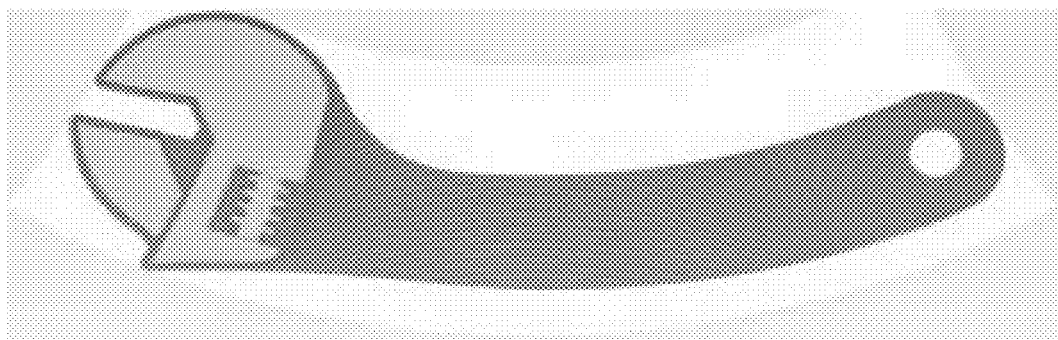

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

The inkjet printing heads dispense layers of building material via inkjet technology. Each of the printing heads can be configured to dispense a different building material. When a particular printing head comprises two or more nozzle arrays, each nozzle array can be configured to dispense a different building material. Thus, different target locations can be occupied by different building materials.

The type of material that is conveyed to each nozzle array of each printing head for dispensing is optionally and preferably controlled by controller 20. For example, controller 20 can signal a building material supply system 42 to supply a first modeling material to one nozzle array of a first head and a support material to another nozzle array of the first head. Controller 20 can also signal system 42 to supply the first modeling material to one nozzle array of the first head, the support material to another nozzle array of the first head, and a second modeling material to one nozzle array of a second head. Alternatively, controller 20 can signal system 42 to supply the support material to a nozzle array of another head. Controller 20 can also signal system 42 to supply the first modeling material to one nozzle array of the first head, the support material to another nozzle array of the first head, the second modeling material to one nozzle array of the second head, and a third modeling material to another nozzle array of the second head, and so on.

In some embodiments of the present invention radiation source 18 is configured to reciprocally move relative to tray along the radial direction r. These embodiments are useful when the length of radiation source 18 is shorter than the width along the radial direction of the working area 26 on tray 12. The motion of radiation source 18 along the radial direction is optionally and preferably controlled by controller 20. Thus, the present embodiments contemplate a radiation source and a printing head, each being independently controllable to move in the radial direction along a separate motion stage. This is unlike conventional three-dimensional printing systems in which the printing head and radiation source are mounted on the same printing block and are therefore forced to move simultaneously. In some embodiments of the invention controller 20 is configured to move radiation source 18 and head(s) 18 non-simultaneously along the radial direction during the operation of system 10. In some embodiments of the invention controller 20 is configured to move radiation source 18 and head(s) 18 non-simultaneously independently along the radial direction during the operation of system 10. These embodiments are particularly useful when it is desired to select the time at which solidification (e.g., curing) is initiated, for example, to delay the solidification.

System 10 optionally and preferably comprises a solidification system 18 for solidifying (e.g., curing) the building material formulation. Solidification system 18 can comprise one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. In various exemplary embodiments of the invention the operation of solidification system 18 is controlled by controller 20 which may activate and deactivate solidification system 18. When solidification system comprises a radiation source, controller 20 optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1B).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object.

It is expected that during the life of a patent maturing from this application many relevant AM systems will be developed and the scope of the term AM system is intended to include all such new technologies a priori.

Oftentimes, the width along the indexing direction of a layer to be formed is larger than the width of a single printing head. In these situations, several passes over the tray (or previously formed layers) are required to complete the formation of the layer. An example of such a process is illustrated in FIGS. 4A-G, describing the formation of two layers 402 and 404 on tray 12. In this example, the final height of each of layers 402 and 404 along the vertical direction Z is $L_h$. This height is typically defined within the computer object data.

Figure 4A:
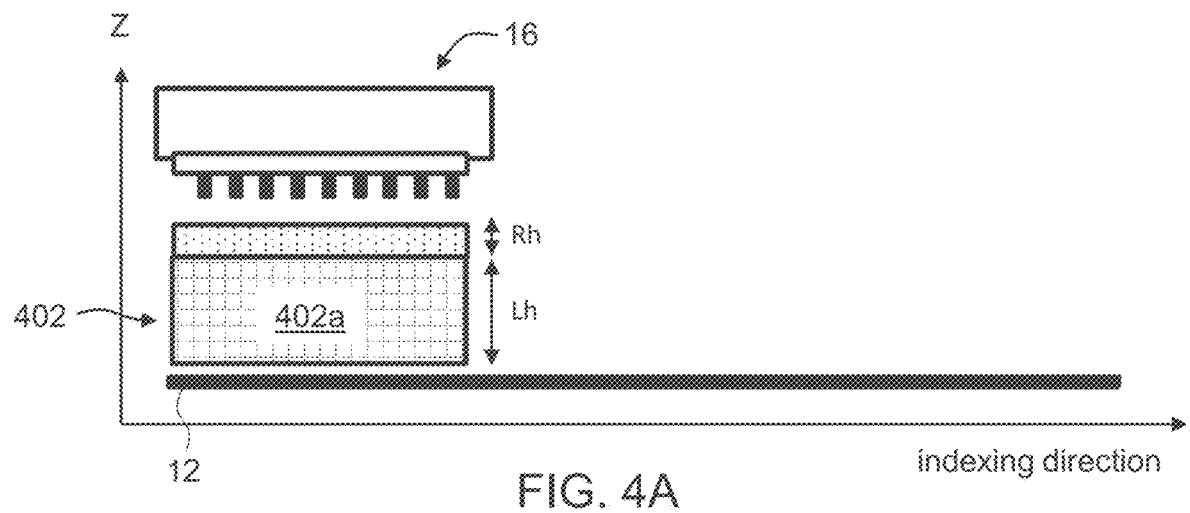
FIGS. 4A-G are schematic illustrations of a process for forming a layer that is wider than the width of a printing head.
Figure 4B:
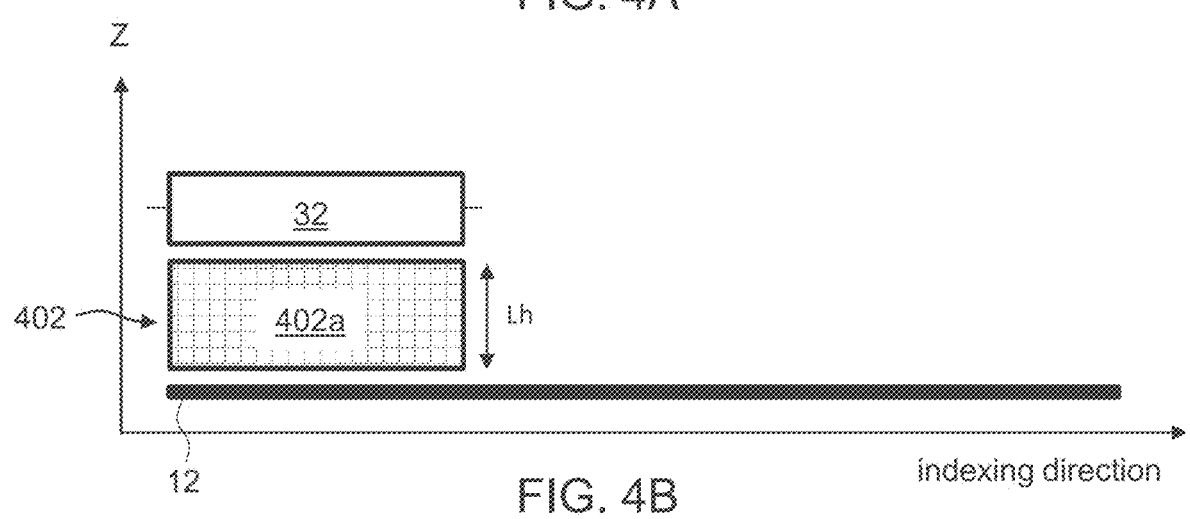
Figure 4C:
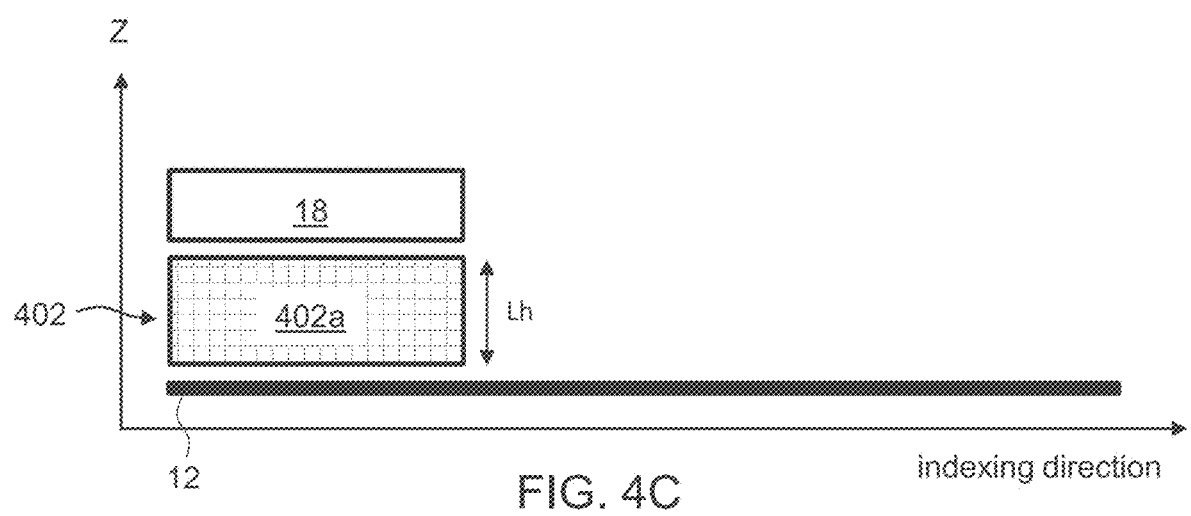
Figure 4D:
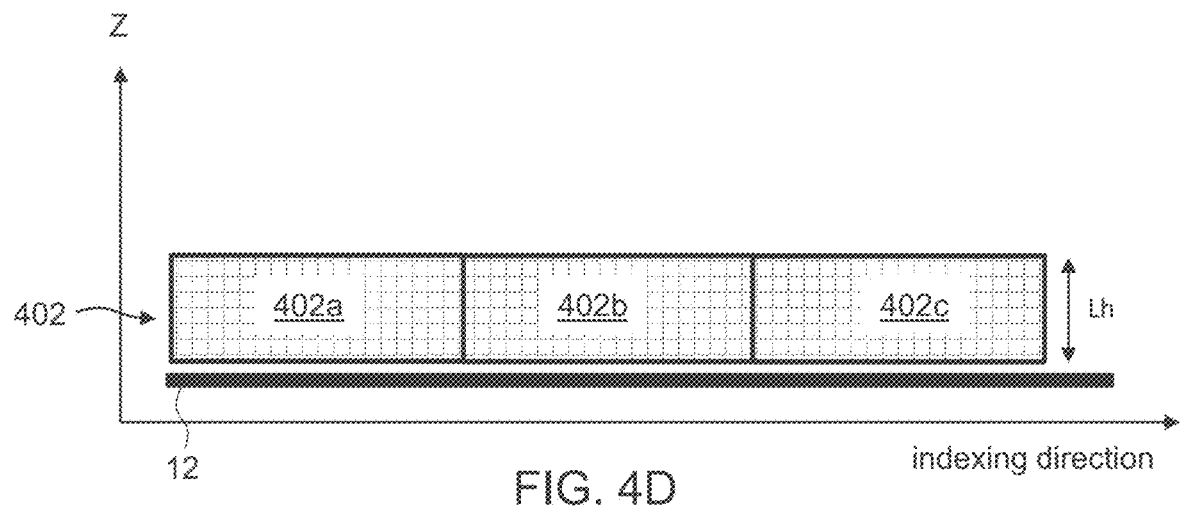

Head 16 dispenses a building material to form a first portion 402a of layer 402 (FIG. 4A). The height of portion 402a, immediately after it is dispensed, is $L_h+R_h$, where $R_h$ is a fraction of $L_h$. Typically, $R_h$ can be from about 5% to about 40%. Thus, immediately after the dispensing, the height of portion 402a is slightly higher than the desired height $L_h$. Leveling device 32 then follows head 16 and levels portion 402a by removing extra building material at the topmost $R_h$ part of portion 402a (FIG. 4B), resulting in a height of $L_h$. Portion 402a is then solidified, for example, by means of solidification system 18 (FIG. 4C). Head 16 then moves along the indexing direction, and the process described in FIGS. 4A-C is repeated to form other portions of layer 402. FIG. 4D illustrates the situation after layer 402, including three portions 402a, 402b and 402c that are laterally displaced from each other along the indexing direction is completed.

Figure 4E:
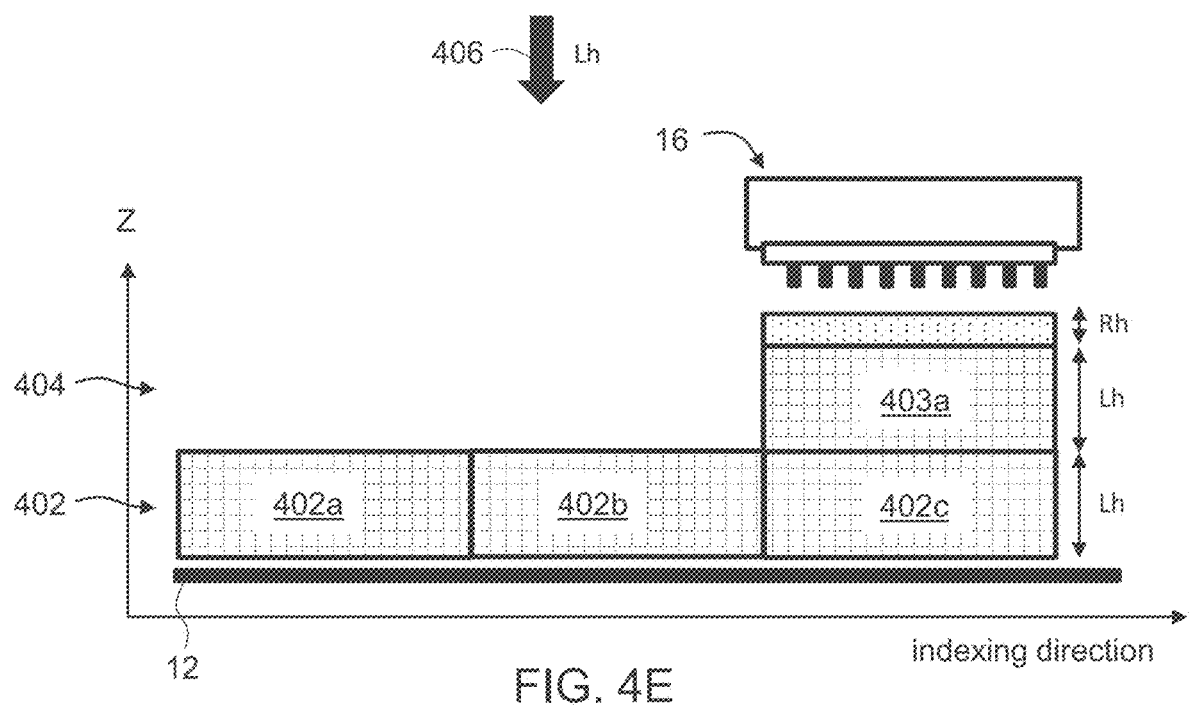
Figure 4F:
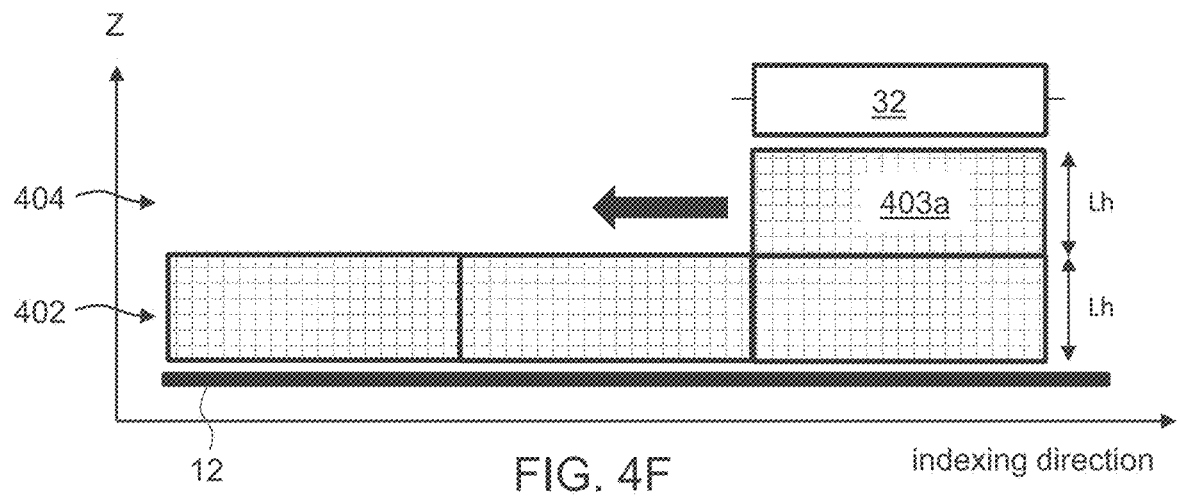
Figure 4G:
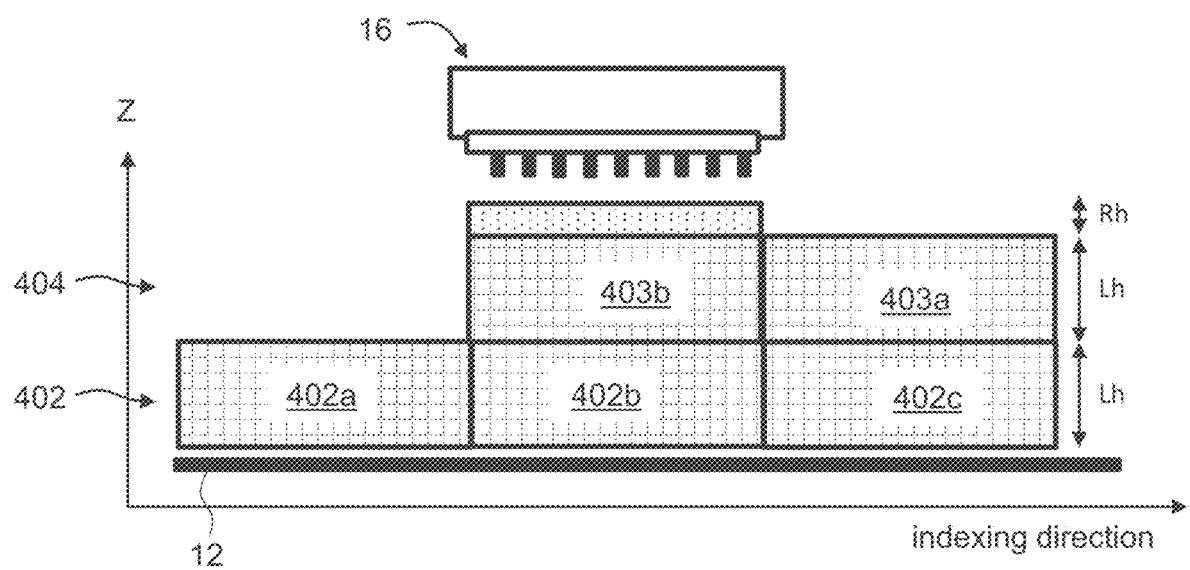

Once layer 402 is completed, the vertical distance between leveling device 32 and tray 12 is increased 406 by $L_h$, and head 16 dispenses a building material to form a first portion 403a of layer 403 (FIG. 4E). Leveling device 32 then follows head 16 and levels portion 403a by removing the extra building material at topmost $R_h$ part of portion 403a (FIG. 4F), resulting in a height of $L_h$. Portion 403a is then solidified as described above, and head 16 reciprocates along the indexing direction, to dispense a second portion 404b of layer 404 (FIG. 4G), and so on.

The inventor unexpectedly found that the above process may occasionally be stalled. In a research performed by the inventor, it was found that such a stalling typically occurs when there is a mismatch between the widths and/or positions along the indexing direction of the head and leveling device. The inventor discovered that the reason for the stalling in such situation is that imperfections of the topmost surface of the layer may result in a contact between the surface of leveling device 32 and the topmost surface of a solidified portion of the layer. This problem is illustrated in FIGS. 5A-D. The illustrated problem is for a case in which leveling device 32 is wider than head 16 along the indexing direction.

Figure 5A:
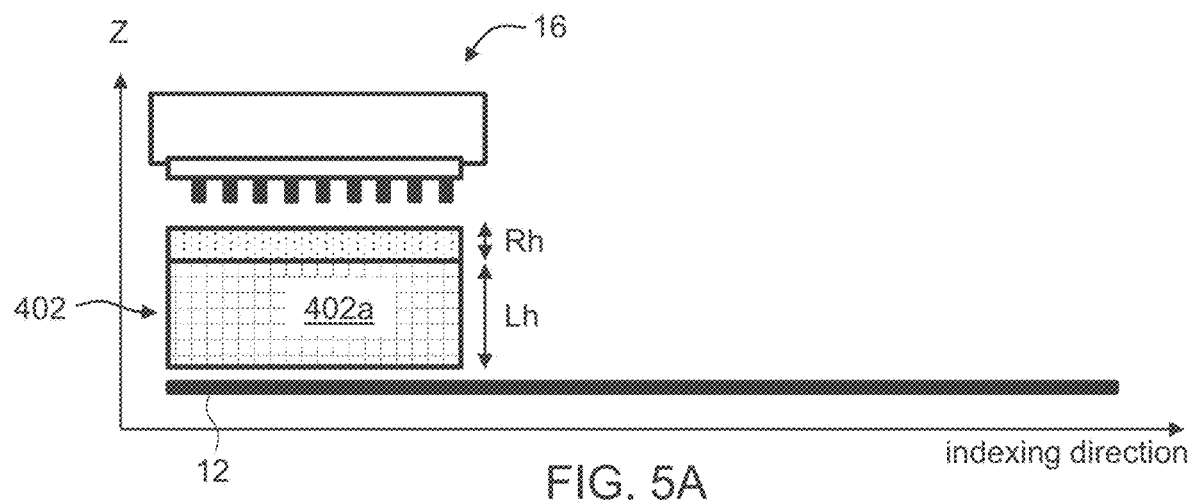
FIGS. 5A-D are schematic illustrations of a problem associated with the process illustrated in FIGS. 4A-G when using a leveling device that is wider than the printing head.
Figure 5B:
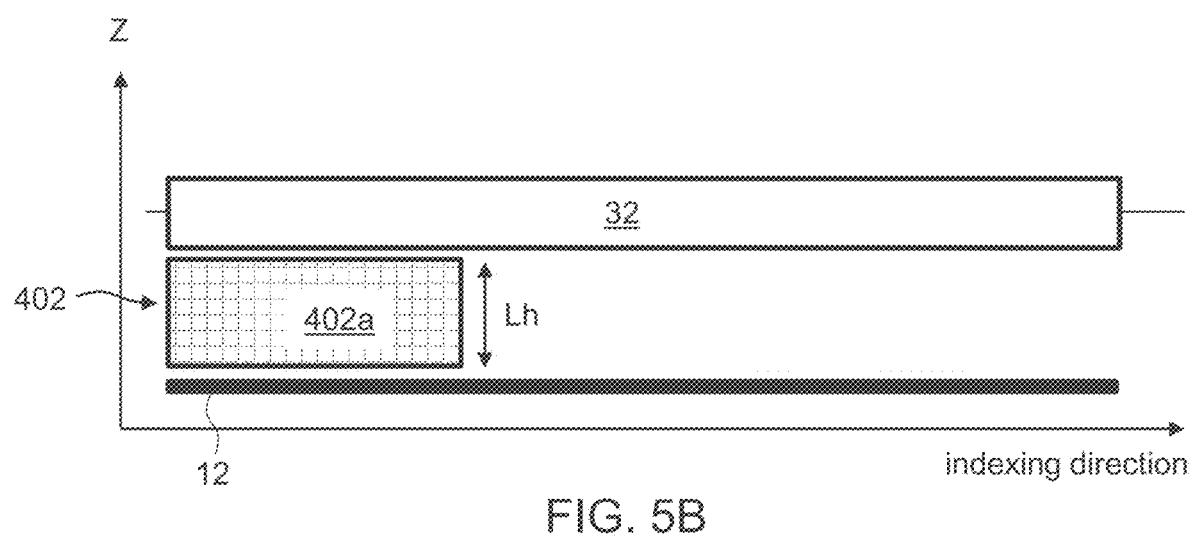
Figure 5C:
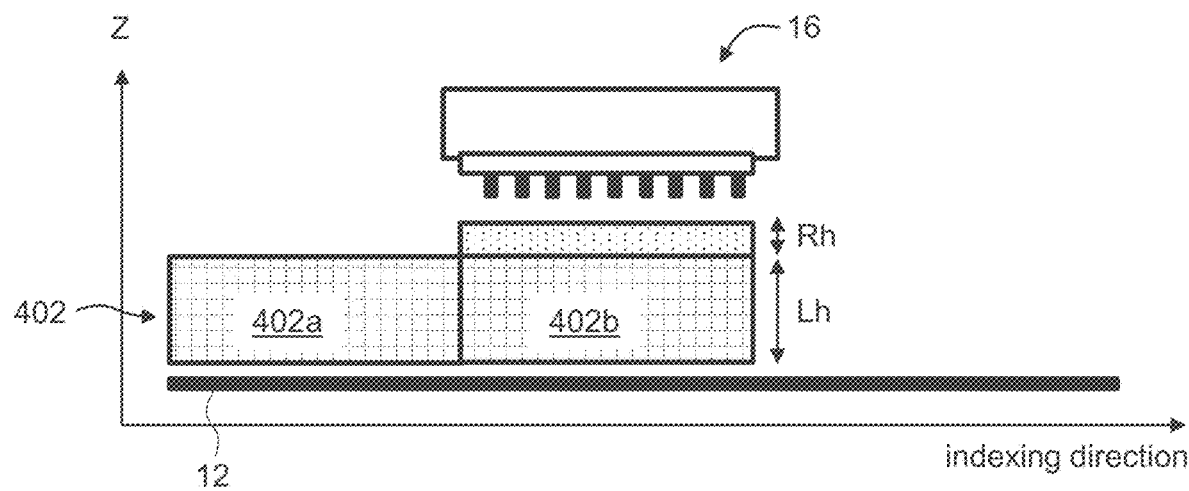
Figure 5D:
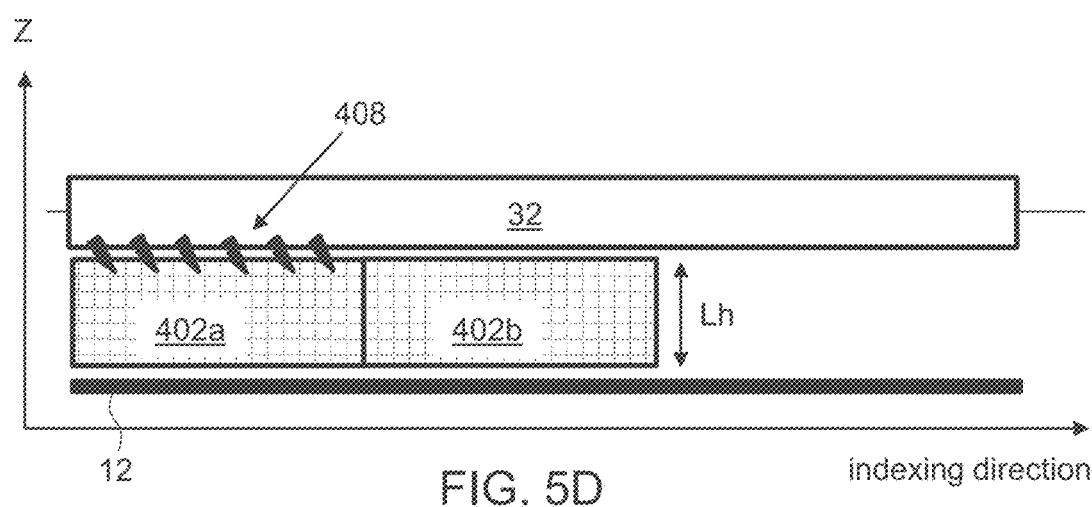

Referring to FIGS. 5A and 5B, head 16 dispenses a building material to form a first portion 402a of layer 402, at a height of $L_h+R_h$, and leveling device 32 follows head 16 and levels portion 402a as described above. Portion 402a is then solidified (process not shown). Head 16 then moves along the indexing direction, and dispenses a building material to form second portion 402b of layer 402 (FIG. 5C). Leveling device 32 then follows head 16 and attempts to level portion 402b. However, due to imperfections at the topmost surface of portion 402a, leveling device 32, which is wider than head 16, hits or scrapes solidified portion 402a, as generally shown at 408 (FIG. 5D). This stalls the fabrication process.

In search of a solution to the above problem, the inventor devised a technique in which the vertical distance between a portion of a particular layer and the leveling device is increased before dispensing the building material to form the next portion of the particular layer.

Figure 6:
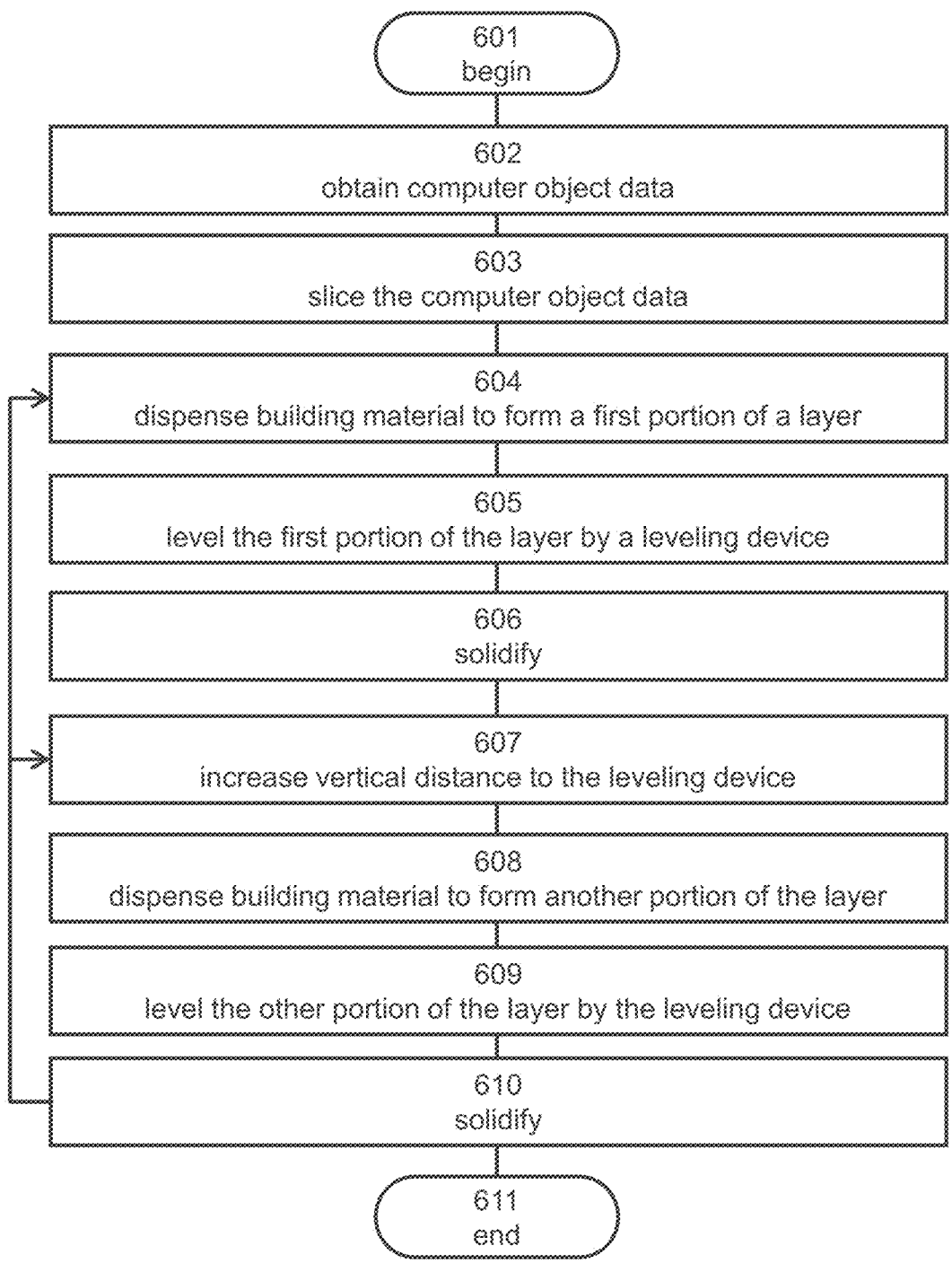
FIG. 6 is a flowchart diagram describing a method suitable for fabricating a three-dimensional object, according to various exemplary embodiments of the present invention.

FIG. 6 is a flowchart diagram and FIGS. 7A-I are selected process steps describing a method suitable for fabricating a three-dimensional object, according to various exemplary embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method of the present embodiments can be executed by a computerized controller (e.g., controller 20) of an AM system (e.g., system 10).

The method is typically executed using an AM system in which there is a mismatch between the widths and/or positions along the indexing direction of the head and leveling device. Preferably, the method is executed using an AM system in which the leveling device is wider than the printing head along the indexing direction. For example, the leveling device can extend over a width of layer along the indexing direction by its entirety. In some embodiments of the present invention, the method is executed using an AM system in which the leveling device is non-movable along indexing direction.

Referring to FIG. 6, the method begins at 601 and optionally and preferably continues to 602 at which computer object data are obtained, for example, from an external source. The computer object data can include a plurality of graphic elements (e.g., a mesh of polygons, non-uniform rational basis splines, etc.) defining a surface of the object. In some embodiments of the present invention the graphic elements are transformed to a grid of voxels defining the shape of the object, for example, using a slicing procedure 603 that form a plurality of slices, each comprising a plurality of voxels describing a layer of the 3D object. Alternatively, the method can receive sliced computer object data from an external source, e.g., a computer readable medium, in which it is not necessary to execute operation 603.

Since the grid of voxels and the plurality of graphic elements describe the same object, the term "computer object data" is used herein both in relation to the grid of voxels and in relation to the plurality of graphic elements. Thus, when the computer object data relate to the grid of voxels, each element of the computer object data is a voxel, and when the computer object data relate to the graphic elements each element of the computer object data is a graphic element, e.g., a polygon, a spline, etc.

Figure 7A:
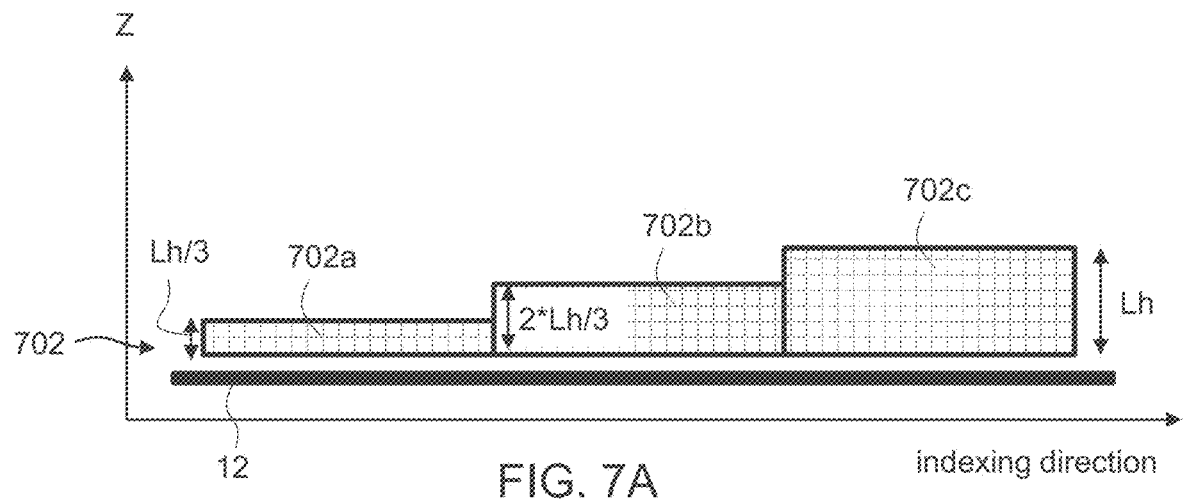
FIGS. 7A-I are schematic illustrations describing some operations of the method of FIG. 6.
Figure 7B:
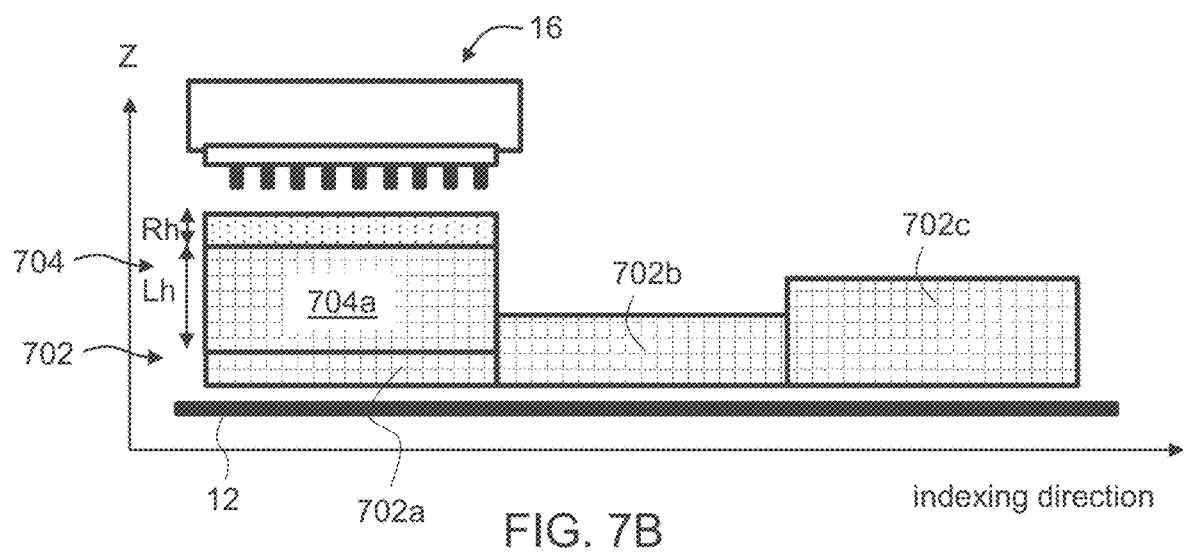

In some embodiments of the present invention the method continues to 604 at which a building material formulation is dispensed, preferably by a printing head (e.g., head 16) to form a first portion 704a of a layer 704. The operation 604 is illustrated in FIG. 7B. FIG. 7B shows portion 704a once dispensed on a portion 702a of a previously formed and solidified layer 702, having a non-uniform thickness. Layer 702 has a plurality of portions 702a, 702b, 702c each having a different thickness (see FIG. 7A). A process suitable for forming a layer with a non-uniform thickness on a flat surface (e.g., tray 12 or a topmost surface of a previously formed flat layer) will be described below with reference to FIGS. 8A-F.

The height of portion 704a, immediately after it is dispensed at 604, is $L_h+R_h$, where $L_h$ is, as stated, the height of a slice of the computer object data obtained at 602 or 603 and $R_h$ is a fraction of $L_h$. Typically, $R_h$ can be from about 5% to about 40%.

Figure 7C:
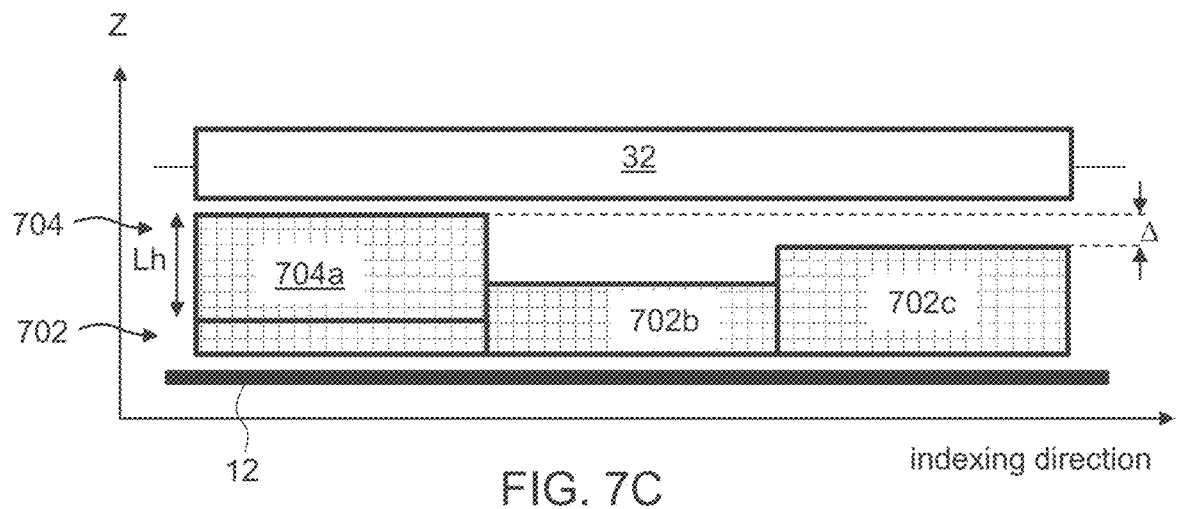

The method proceeds to 605 at which portion 704a is leveled by a leveling device (e.g., leveling device 32). The leveling device removes the extra building material at topmost $R_h$ part of portion 704a, as illustrated in FIG. 7C. The height $L_h+R_h$ of portion 704a is preferably selected such that the vertical position of the topmost surface of portion 704a, once leveled, is substantially above the topmost surface of the thickest portion of layer 702 (portion 702c in the present example). The vertical distance between the topmost surface of portion 704a, once leveled, and topmost surface of portion 702c, is denoted Δ. A typical value for Δ is from about $L_h/5$ to about $L_h/2$. In some embodiments, the Δ value between adjacent portions is comprised between about 0.5 μm and 20 μm, between 1 μm and 10 μm, or between 2 μm and 5 μm. Thus, unlike the situation in FIG. 5D, the leveling device does not contact a solidified surface during the leveling operation.

Figure 7D:
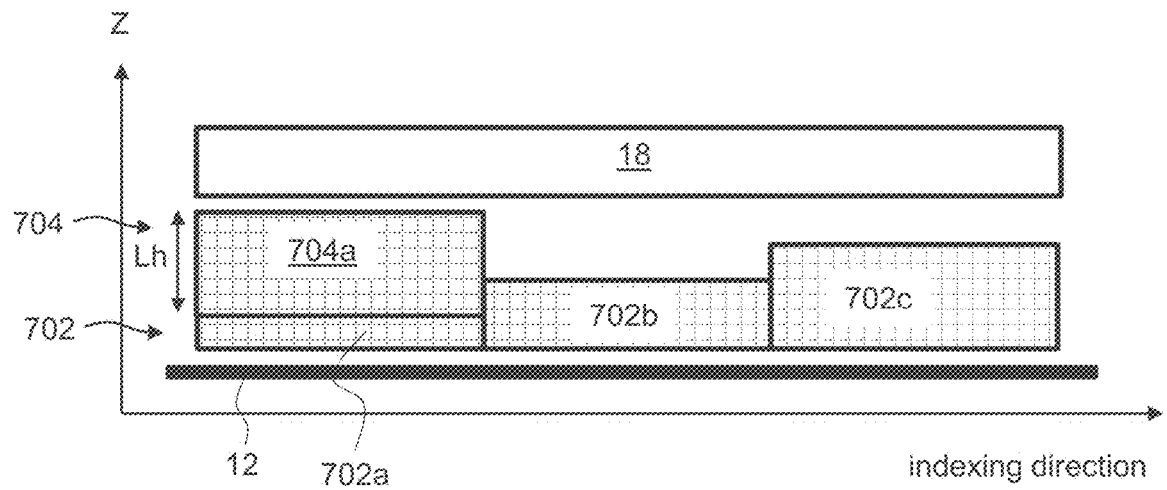
Figure 7E:
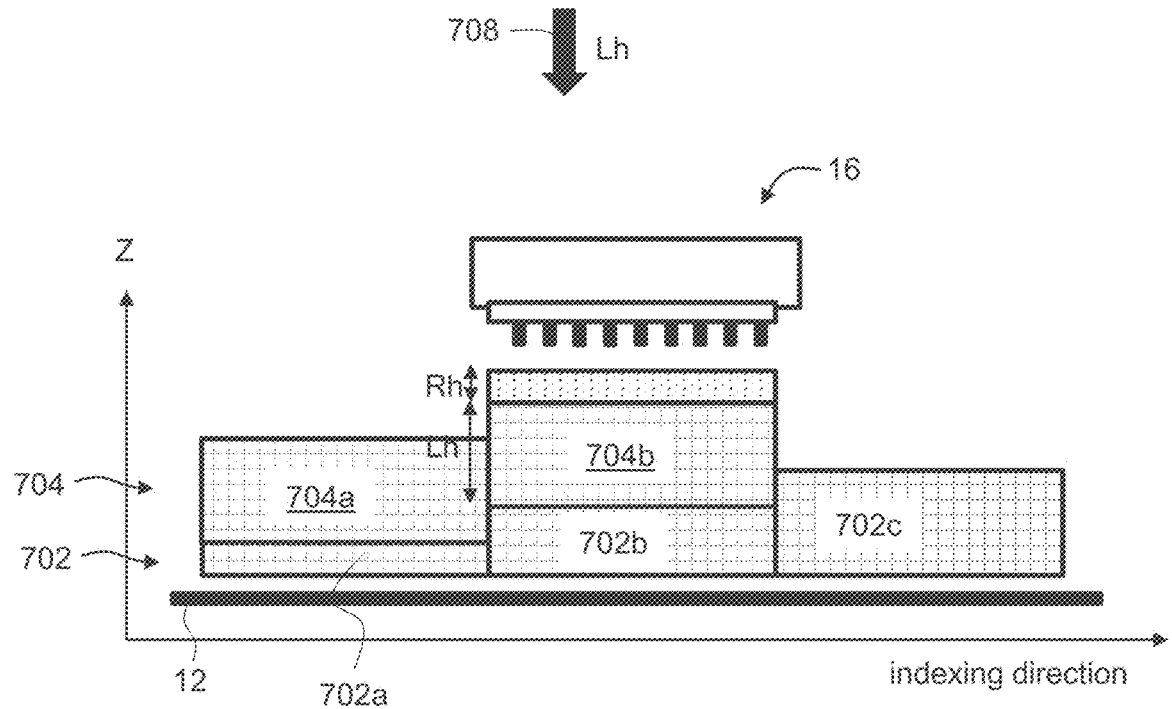

In some embodiments of the present invention the method proceeds to 606 at which portion 704a is solidified, for example, by means of solidification system 18 (FIG. 7D). The method optionally and preferably continues to 607 at which a vertical distance between portion 704a and leveling device 32 is increased, for example, by lowering the vertical position of tray 12. At 608 a building material formulation is optionally and preferably dispensed to form a second portion 704b of layer 704 (FIG. 7E). Portion 704b is laterally displaced from first portion 704a along the indexing direction. In various exemplary embodiments of the invention the dispensing 608 is executed while a topmost surface of first portion 704a is exposed and is directly beneath a segment of the leveling device (shown in FIG. 7F).

The topmost surface of first portion 704a is exposed during the dispensing 608 in the sense that no building material is dispensed on portion 704a before or during the formation of portion 704b.

The height of portion 704b, immediately after it is dispensed at 608, can be $L_h+R_h$, as further detailed hereinabove. The increment of the vertical distance is preferably selected such that the vertical position of the topmost surface of portion 704b is substantially above the vertical position of the topmost surface of any other previously formed portion. Typically, the vertical distance is increased by $L_h$, as shown at 708.

Figure 7F:
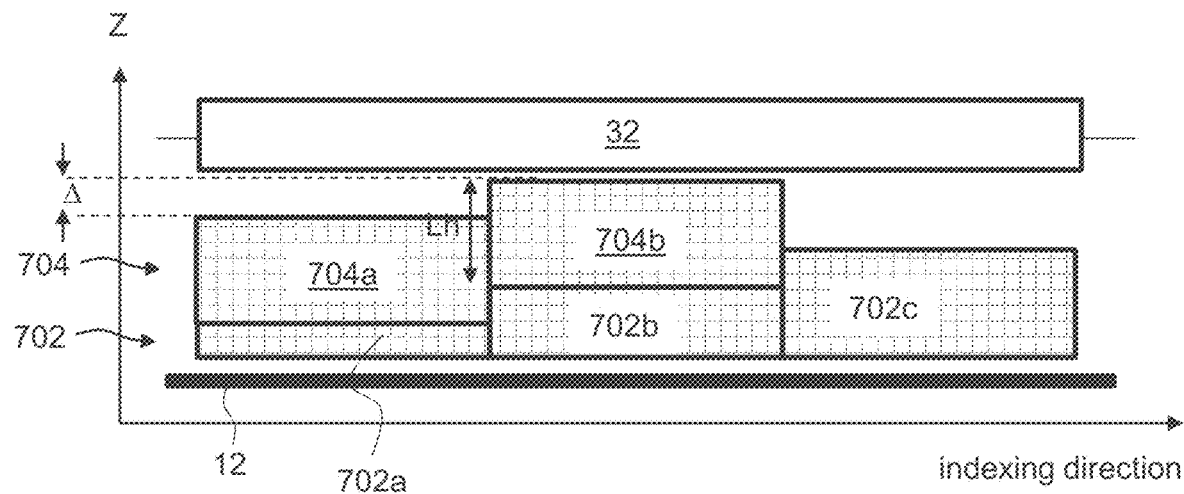

The method proceeds to 609 at which portion 704b is leveled by a leveling device (e.g., leveling device 32), which removes the extra building material at topmost $R_h$ part of portion 704b, as illustrated in FIG. 7F. Operation 607 is unlike the processes described above with reference to FIGS. 4F and 5C, since in these processes the vertical distance between the leveling device and the tray remains the same during the formation of portions of the same layer. The advantage of operation 607 is that it ensures that the vertical position of the topmost surface of portion 704b, once leveled, is substantially above the topmost surface of any other previously formed portion and therefore prevents contact between the leveling device and a solidified surface. The vertical distance between the topmost surface of portion 704b, once leveled, and topmost surface of portion 704a, can also be Δ.

Optionally, the method proceeds to 610 at which portion 704b is solidified, for example, by means of solidification system 18.

Figure 7G:
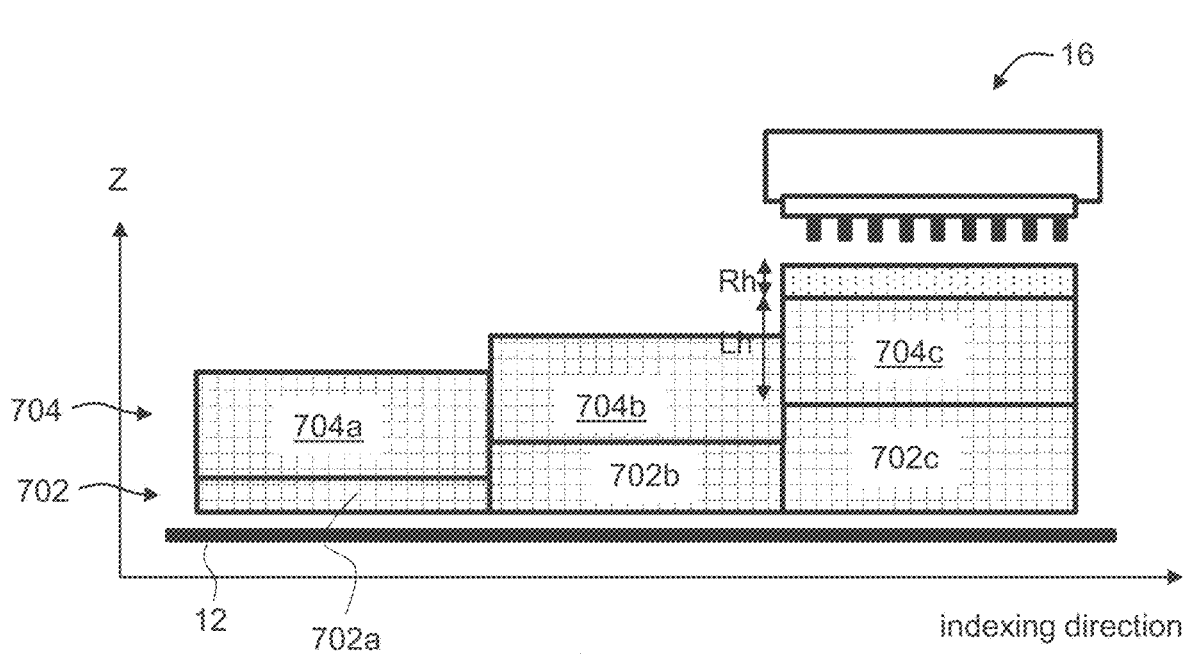
Figure 7H:
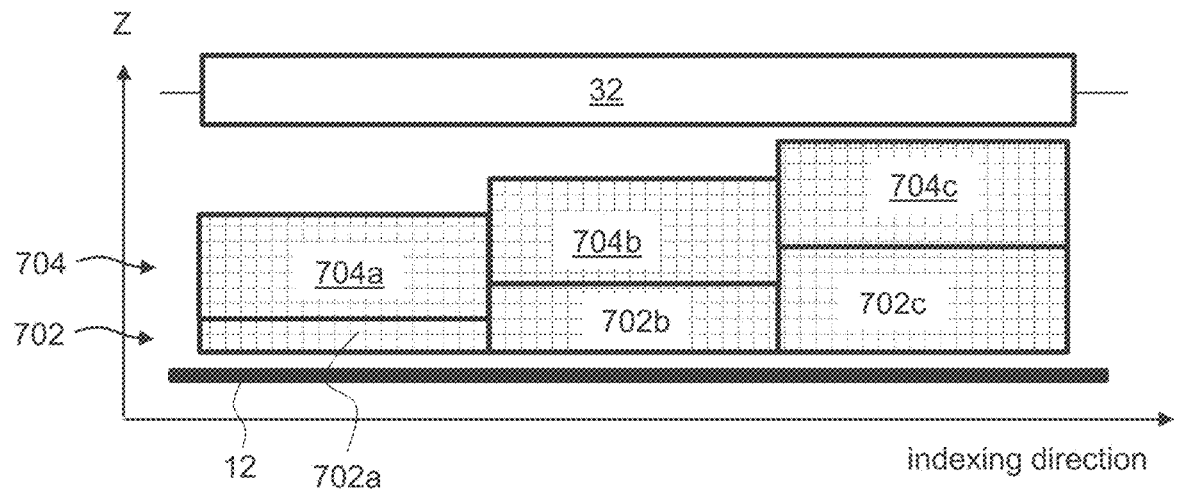

In some embodiments of the present invention the method loops back to 607 to form another portion 704c of layer 704, as illustrated in FIGS. 7G and 7H. Once all the portions of layer 704 are formed and optionally also solidified, the vertical distance between layer 704 and the leveling device can be increased 708 and the method can loop back to 604 to form portions of a subsequent layer 706, as illustrated in FIG. 7I.

Figure 7I:
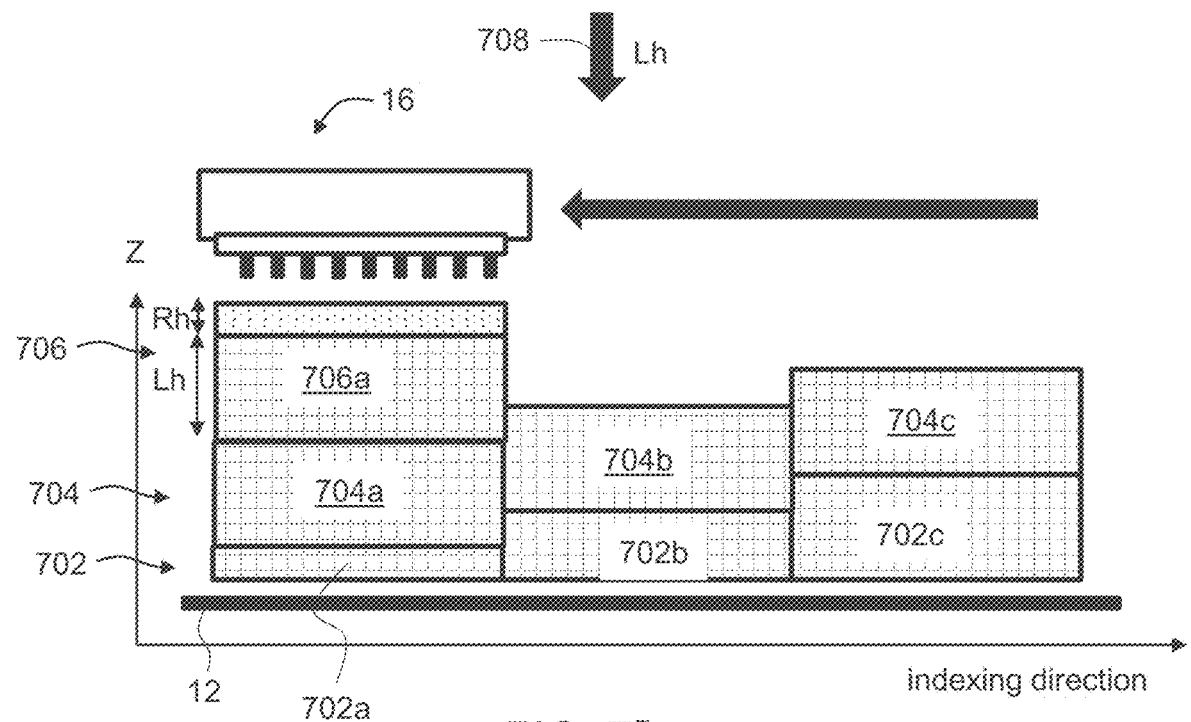

In the illustration of FIG. 7I, the portions of next layer (layer 706, in the present example) are formed in the same order as the portions of the layer just completed (layer 704, in the present example). Thus, for example, a first portion 706a of layer 706 is formed on first portion 704a of layer 704, and so on. This is unlike the situation in FIGS. 4E-G wherein the order in which layer 404 is formed is reciprocal to the order in which layer 402 is formed. The advantageous of the illustration shown in FIG. 7I is that it allows maintaining the same height for all portions of all layers.

It is appreciated that at the topmost layer, there may be a difference Δ between adjacent portions. However, since the value of Δ is typically small, this difference is hardly noticeable with an unaided eye.

The method ends at 611.

In any of the above embodiments, different portions of the same layer or different portions of different layers can be formed from the same or different building material formulations, as desired. Thus, at least one of the following embodiments is contemplated: (i) two portions of the same or different layer are formed of the same modeling material or the same support material, (ii) two portions of the same or different layer are formed of different modeling materials, and (iii) for the same or different layer, one portion is formed of a support material and another portion is formed of a modeling material.

Reference is now made to FIGS. 8A-F which illustrate a process suitable for forming a layer with a non-uniform thickness on a flat surface. In the illustrated example, e.g., tray 12 or a topmost surface of a previously formed flat layer) will be described below with reference to FIGS. 8A-F.

Figure 8A:
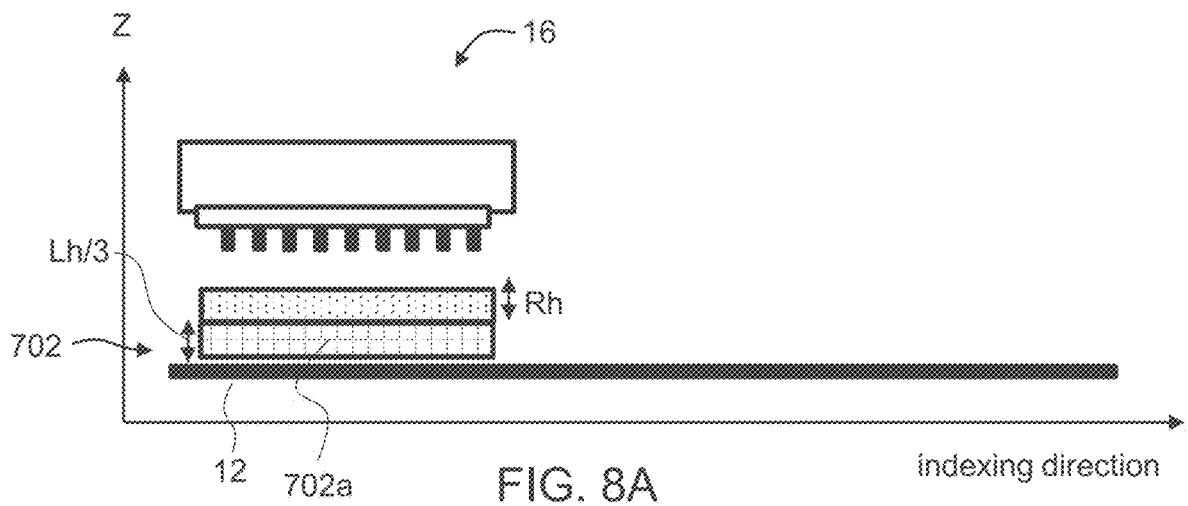
FIGS. 8A-F are schematic illustrations describing a process suitable for forming a layer with a non-uniform thickness on a flat surface, according to some embodiments of the present invention.
Figure 8B:
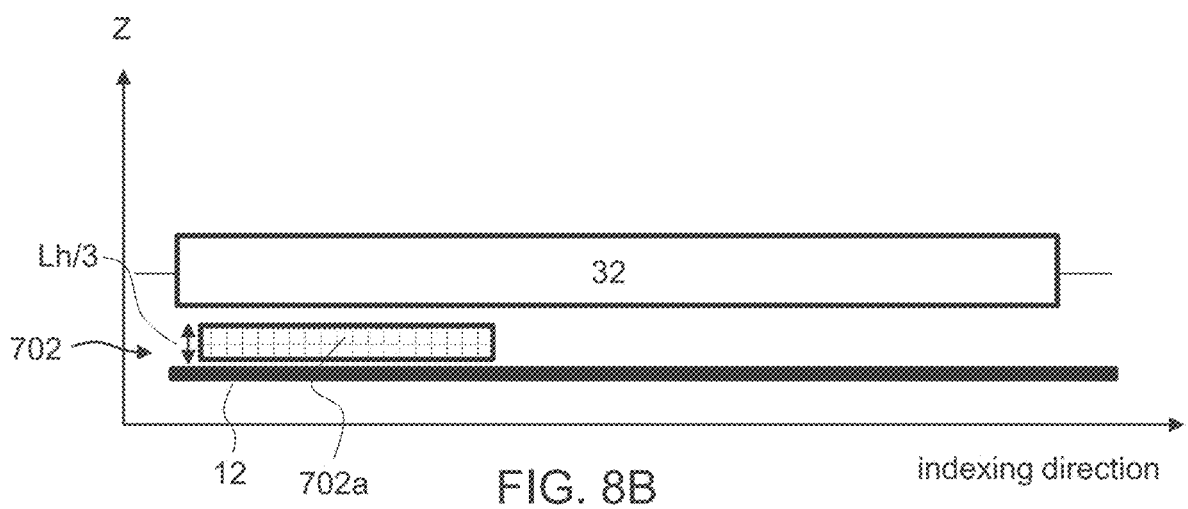
Figure 8C:
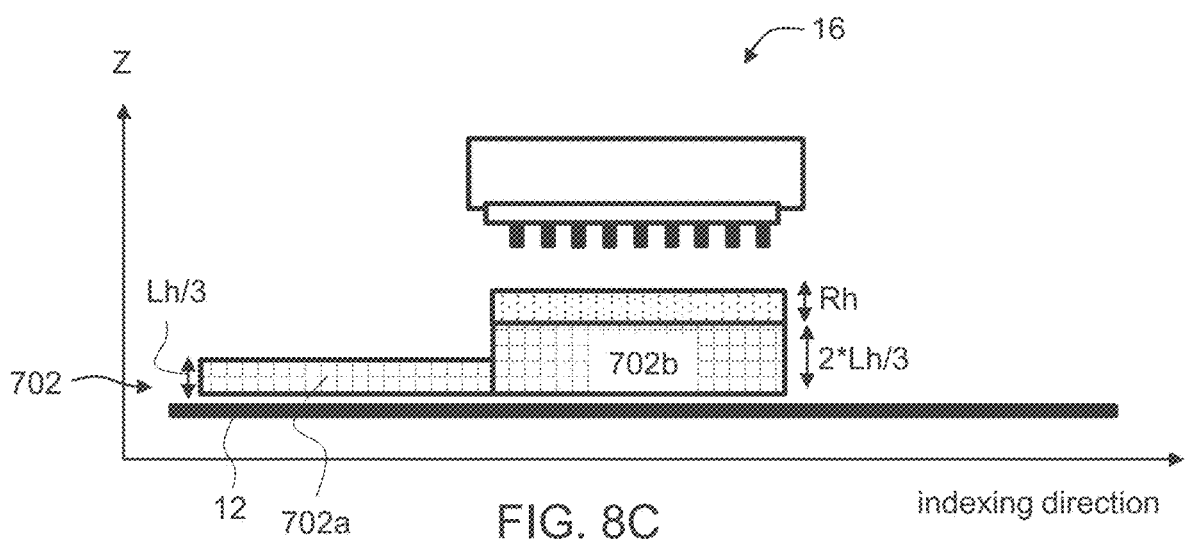

A building material is dispensed to form a first portion 702a of layer 702 (FIG. 8A). The height of portion 702a, immediately after it is dispensed, is optionally and preferably $(L_h/N)+R_h$, where $R_h$ is a fraction of $L_h$, and N is a number that is greater than 1. Typically, $R_h$ can be from about 5% to about 40%. In some embodiments of the present invention, N is the ratio between the width of layer 702 along the indexing direction and the width of head 16 along the indexing direction. Optionally, N is a nearest integer of this ratio. A representative example for the value of N is N=3. This representative example is illustrated in FIGS. 8A-F.

Figure 8D:
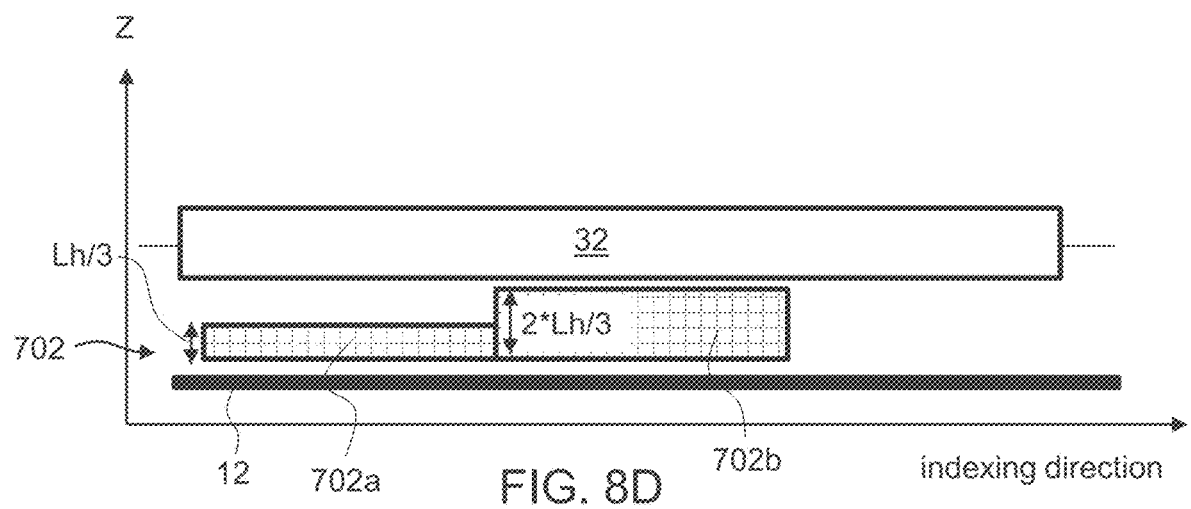
Figure 8E:
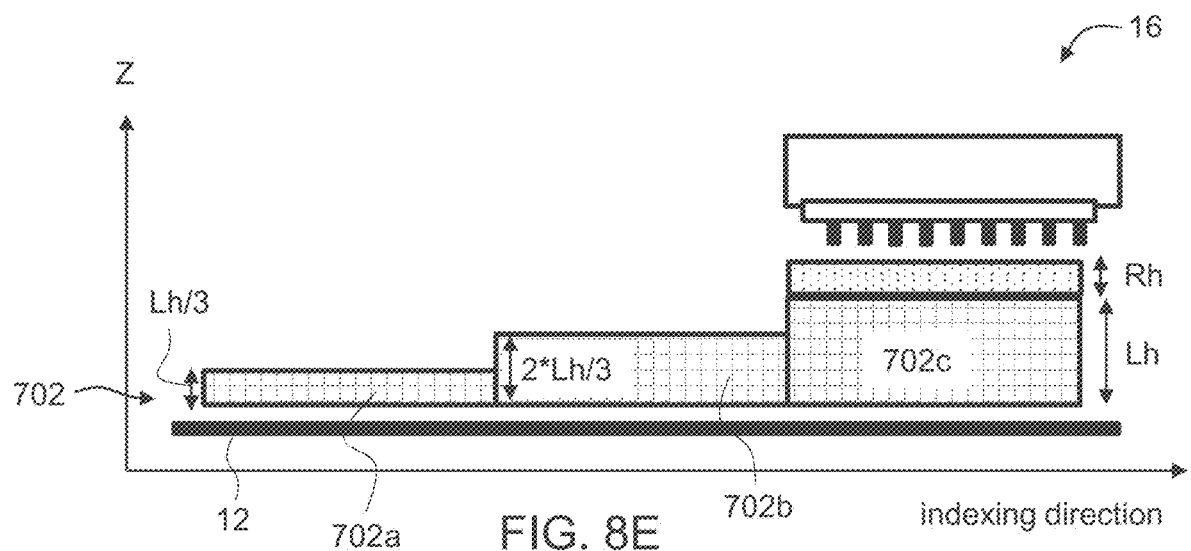
Figure 8F:
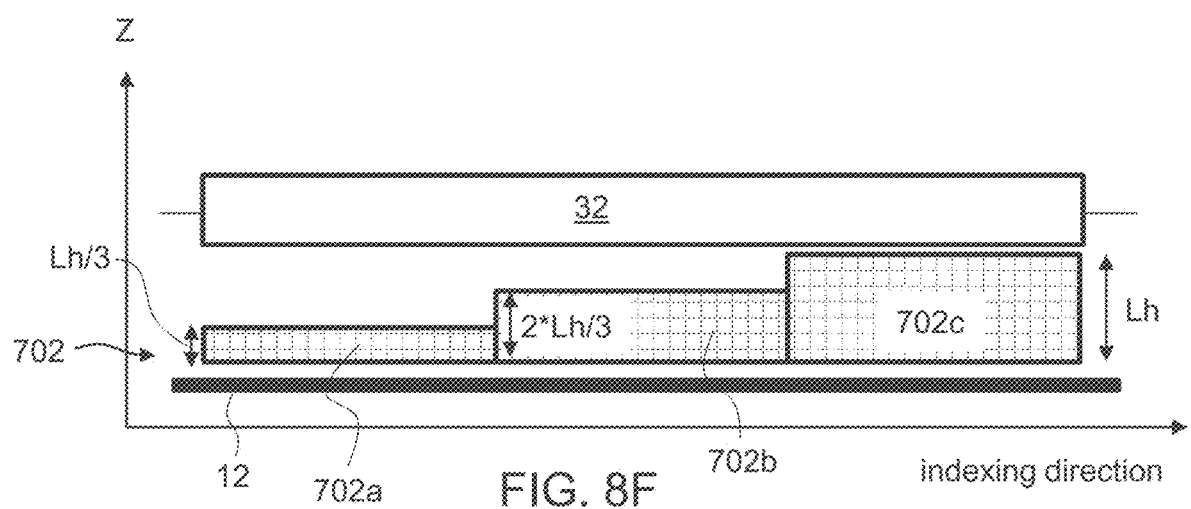

Leveling device 32 then follows head 16 and levels portion 702a by removing the topmost $R_h$ part of extra building material (FIG. 8B), resulting in a height of $L_h/N$. Portion 702a is then solidified, for example, by means of solidification system 18 (not shown in FIGS. 8A-F). Head 16 then moves along the indexing direction, and a building material is dispensed to form a second portion 702b of layer 702 (FIG. 8C), that is laterally displaced from portion 702a along the indexing direction. The height of portion 702b, immediately after it is dispensed, is optionally and preferably larger than the height of portion 702a. Leveling device 32 then follows head 16 and levels portion 702b by removing the topmost $R_h$ part of extra building material (FIG. 8D). Portion 702a is then solidified, for example, by means of solidification system 18 (not shown in FIGS. 8A-F). The procedure can be repeated for forming, leveling and optionally solidifying one or more additional portions of layer 702, as illustrated in FIGS. 8E and 8F. The height of each additional portion, immediately after its dispensing, is preferably larger than the other portions. In an embodiment, the heights form an approximate arithmetic series with an additional height $R_h$ to be removed during leveling. For example, the height of portion 702b can be about twice the height of portion 702a, with an addition of height $R_h$, and the height of portion 702c can be about three times the height of portion 702a, with an additional height $R_h$.

As used herein the term "about" or "approximately" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of fabricating an object in layers, the method comprising, for at least one layer:
   during a relative motion between a tray and a printing head along a scanning direction and under a control of a controller, dispensing from said printing head a building material formulation to form a first portion of said layer, and leveling said first portion by a leveling device;
   increasing a vertical distance between said first portion and said leveling device; and
   while a topmost surface of said first portion is exposed and beneath a segment of said leveling device: dispensing a building material formulation to form a second portion of said layer, laterally displaced from said first portion along an indexing direction, and leveling said second portion by said leveling device;
   wherein said indexing direction is at an angle to said scanning direction.

2. The method according to claim 1, further comprising increasing a vertical distance between said second portion and said leveling device; and
   while a topmost surface of said second portion is beneath a segment of said leveling device and is exposed: dispensing a building material formulation to form a third portion of said layer, laterally displaced from said first and said second portions along said indexing direction, and leveling said third portion by said leveling device.

3. The method according to claim 1, further comprising solidifying each of said first portion of said layer and said second portion of said layer prior to a formation of a subsequent portion of said layer.

4. The method according to claim 1, wherein said at least one layer is a plurality of layers, and wherein for each layer of said plurality of layers, formations of said portions are repeated in a same order.

5. The method according to claim 1, wherein said leveling device extends over an entire width of said layer along said indexing direction, and is non-movable along said indexing direction.

6. The method according to claim 1, wherein said first portion and said second portions are formed from different building material formulations.

7. The method according to claim 1, wherein said first portion and said second portions are formed from the same building material formulations.

8. The method according to claim 1, wherein said dispensing is executed by a printing head of a solid freeform fabrication system, and wherein said increase of said vertical distance is by $L_h/N$, $L_h$ being a height of said layer, and N being a number greater than 1.

9. The method according to claim 1, being executed by a solid freeform fabrication system which comprises:
   a rotary tray configured to rotate about a vertical axis; and
   the printing head, having a plurality of separated nozzles, and operable to dispense said building material formulation during said rotation, wherein said indexing direction is a radial direction defined relative to said vertical axis.

10. The method according to claim 9, wherein said solid freeform fabrication system comprises a plurality of printing heads, each configured to reciprocally move relative to said rotary tray along said radial direction, wherein for at least two of said plurality of inkjet printing heads, said reciprocal motion is independent and at a different azimuthal angle.

11. A solid freeform fabrication (SFF) system for fabricating an object in layers, the system comprising:
   a tray;
   a printing head, having a plurality of separated nozzles for dispensing one or more building material formulations;
   a leveling device for leveling said dispensed building material formulation; and
   a controller configured to control said printing head so as to dispense, during a relative motion between said tray and said printing head along a scanning direction, at least one building material formulation of said one or more building material formulations to form a first portion of a layer, to ensure a contact between said leveling device and said first portion so as to level said first portion, to increase a vertical distance between said first portion and said leveling device following said leveling, to dispense at least one building material formulation of said one or more building material formulations so as to form a second portion of said layer that is laterally displaced from said first portion along an indexing direction, and, while a topmost surface of said first portion is exposed and beneath a segment of said leveling device, to ensure contact between said leveling device and said second portion but not said first portion so as to level said second portion, wherein said indexing direction is at an angle to said scanning direction.

12. The system according to claim 11, further comprising a solidification system for solidifying each of said first portion of said layer and said second portion of said layer prior to a formation of a subsequent portion of said layer.

13. The system according to claim 11, wherein said controller is configured to ensure that said formations of said portions are repeated at a same order for each of a plurality of layers of the object.

14. The system according to claim 11, wherein said leveling device extends over an entire width of said layer along said indexing direction, and is non-movable along said indexing direction.

15. The system according to claim 11, comprising N printing heads, wherein said increase of said vertical distance is by $L_h/N$, $L_h$ being a height of said layer.

16. The system according to claim 11, wherein said tray is a rotary tray configured to rotate about a vertical axis, wherein said printing head is operable to dispense said one or more building material formulations during a rotation of said rotary tray, and wherein said indexing direction is a radial direction defined relative to said vertical axis.

17. The system according to claim 16, comprising a plurality of printing heads, each configured to reciprocally move relative to said tray along said radial direction, wherein for at least two of said plurality of inkjet printing heads, said reciprocal motion is independent and at a different azimuthal angle.

* * * * *